(12) United States Patent
King et al.

(10) Patent No.: US 8,662,517 B2
(45) Date of Patent: Mar. 4, 2014

(54) STEERING BEARING ASSEMBLY

(75) Inventors: Christopher Dale King, Portland, OR (US); Erik Steven Drews, Portland, OR (US); Brian Keith Schultz, Portland, OR (US)

(73) Assignee: King Cycle Group, Inc., Portland, OR (US)

( * ) Notice: Subject to any disclaimer, the term of this patent is extended or adjusted under 35 U.S.C. 154(b) by 76 days.

(21) Appl. No.: 13/191,191

(22) Filed: Jul. 26, 2011

(65) Prior Publication Data

US 2013/0026729 A1 Jan. 31, 2013

(51) Int. Cl.
*B62K 21/00* (2006.01)

(52) U.S. Cl.
USPC ............ 280/270; 280/276; 280/279; 280/280

(58) Field of Classification Search
USPC .................. 280/270, 200, 276, 279
See application file for complete search history.

(56) References Cited

U.S. PATENT DOCUMENTS

| | | | |
|---|---|---|---|
| 5,095,770 A | 3/1992 | Rader, III | |
| 5,573,262 A | 11/1996 | Chi | |
| 5,647,684 A | 7/1997 | Chen | |
| 5,775,709 A | 7/1998 | Chen | |
| 6,019,017 A | 2/2000 | Lin | |
| 6,231,063 B1 | 5/2001 | Chi | |
| 6,729,634 B2 | 5/2004 | Tange | |
| 6,883,818 B1 | 4/2005 | Chiang | |
| 7,204,502 B2* | 4/2007 | Tange | 280/276 |
| 7,654,547 B2* | 2/2010 | Bouchez | 280/279 |
| 7,731,445 B2 | 6/2010 | Coaplen | |
| 2004/0007850 A1 | 1/2004 | Crozet et al. | |

OTHER PUBLICATIONS

Fig. 3 from U.S. Appl. No. 13/191,191, filed Jul. 26, 2011, 1 page.

* cited by examiner

*Primary Examiner* — Kevin Hurley
*Assistant Examiner* — Michael Stabley
(74) *Attorney, Agent, or Firm* — Brinks Gilson & Lione

(57) ABSTRACT

A steering bearing assembly includes a cap and a bearing element that define an axial force transmission path therethrough. A compression ring is moveably coupled to the cap and is disposed radially inwardly of the bearing assembly outside of the axial force transmission path. The compression ring includes an inner annular surface adapted to transmit a radial compressive force from the cap to a steerer element. A steering assembly, and method for assembling the steering assembly, also are provided.

36 Claims, 7 Drawing Sheets

FIG. 3 - PRIOR ART

STEERING BEARING ASSEMBLY

FIELD OF THE INVENTION

The present invention relates generally to a steering bearing assembly for use on a bicycle, and to methods of installing such assemblies.

BACKGROUND

Steerer tubes typically are arranged in combination with a head tube and bearing arrangement of a bicycle to allow the user to turn, or steer, the front wheel of the bicycle. In one arrangement, steerer tubes are configured as externally threaded steel tubes. Steering bearing adjustments are made using threaded locking systems, e.g., with adjusting nuts and lock nuts.

More recently, threaded steerer tubes have been replaced with threadless steerer tubes. Steering bearing systems for threadless steerers use fewer parts, resulting in simpler, lighter and easier to adjust assemblies. Typically, threadless steerer tubes require radial clearance between the steering bearing components and the steerer tube to facilitate assembly, allowing the components to be slid onto the steerer tube and then be fixed in place. In such a configuration, however, it may be necessary to connect the bearing, for example a rotating race component thereof, to the steerer tube. As shown for example in U.S. Pat. No. 5,096,770 to Rader, one solution for closing the clearance gap and securely fixing the rotating bearing race to the steerer tube uses a steering bearing top cap in combination with a compression ring. Rader discloses using a single action to simultaneously accomplish both a steerer gripping action and a bearing adjustment, although these two processes may be carried out as separate actions.

Recent trends in the bicycle industry have placed greater demands on the steering bearing systems. The steering bearing system of Rader, with a simple compression ring to grip the steerer, is no longer sufficient to meet the equipment and riding styles of these new trends.

One trend is a move to materials less robust than steel for use as steerer tubes. Initially, steel steerer tubes were replaced by aluminum tubes, which are softer and more susceptible to wear and abuse (e.g., rubbing, scrapes, scratches) than steel tubes. More recently, carbon fiber composites are being used for steerer tubes. While carbon fiber composites may be made extremely light and stiff in bending, they also may be more delicate and susceptible to abuse (dinged, scratched, worn, abraded) because the resins that hold the carbon fibers are softer than steel or aluminum. Typically, carbon fiber structures are excellent in tension and poor in compression. Accordingly, components designed to grip carbon fiber steerer tubes (e.g., compression rings, and stem clamps) may be more likely to damage the carbon fibers at the connection points.

For example, excessive compression forces may collapse or pinch carbon fiber composite steerer tubes such that the steerer tubes are more susceptible to failure in use. Indeed, carbon fiber composite structures may fail during normal loading/use conditions from an accumulation of damage over time (e.g., progressive delamination) or from damage sustained during a past overloading event (e.g., crash). Some steerer tube failures may result from excessive compressive force being applied by stem clamps. These steerer tube failures may cause a loss of steering control as the separation of the steerer tube at the stem connection location causes the handlebars and stem to detach. This trend towards using carbon fiber for steerer tubes is firmly established, so new steering bearing systems are needed that are able to adequately grip the steerer tube without applying excessive compressive gripping forces.

Another trend seen in the bicycle industry is a movement to newer styles of riding and equipment that place greater loads on the steering bearing assemblies. For example, suspension forks have been developed for aggressive downhill riding. These forks have increased the loads on steering bearings by using longer fork legs and shorter spacing between steerer bearings (i.e., shorter head tube and steerer tube). Over time the suspension fork legs have gotten longer (longer travel for bigger bumps) which creates a longer lever arm for impacts and braking forces from the wheel that push against the steering assembly bearings. As fork legs have gotten longer, the handle bar height has been maintained by shortening the frame head tube. The shorter head tube locates the steering bearings closer together. The closer spacing of the steering assembly bearings yields a shorter lever arm for the steerer bearings to resist forces from the fork legs. The two effects have combined (longer lever being resisted by a shorter lever) to increase the forces on the steering bearings by 2 or 3 times.

One of the deficiencies of Rader is that the compression ring of the headset is pushed radially into the steerer tube by axial compressive force applied to the steering bearing assembly. The common geometry of bearings and connections between steering bearing elements (tapered surfaces) may generate thousands of pounds of axial force in response to aggressive riding on modern bicycles. These large axial forces are carried through the compression ring, which may lead to damaging levels of compression on delicate materials like carbon fiber composites.

As shown in one prior art assembly (FIG. 3), a steerer tube 11 passes through head tube 12, cup 9, and bearing element 10. A compression ring 8, top cap 6, stem 4 and spacer(s) 5 slide onto steerer tube 11, with the stem 4 and spacer(s) 5 resting on top cap 6. A nut 3 is fixed in the steerer tube 11, with a stem cap 2 being placed on top of stem 4 and stem cap bolt 1 passing therethrough and threadably engaging the nut 3 so as to draw all of the aforementioned components together. As the stack of components is drawn together by stem cap bolt 1 and stem cap 2, the top cap 6 contacts compression ring 8. Compression ring 8 works in conjunction with the tapered surface of bearing element 10 to apply a radial compressive force 14 against steerer tube 11, rotationally connecting bearing element 10 to steerer tube 11 and radially fixing the steerer tube 11 within bearing element 10.

Once proper adjustment has been achieved, the clamping portion of stem 4 fixes the entire stack of components in place. At the same time, all components are fixed axially. At completion of installation, an axial force transmission path 13 is connected through the stacked components, including compression ring 8. Under the influence of an axial displacement for assembly, compression ring 8 will move such that its tapered surface slides on the corresponding tapered surface of bearing element 10, eventually engaging the steerer tube 11 so that further movement is constrained. In this manner, the axial forces applied to the compression ring results in a radial compressive force being applied to the steerer tube 11. The magnitude of the radial force developed is proportional to the applied axial force, and is dependent on the specific geometry of the mating parts, e.g., the angle of taper of compression ring 8 and bearing element 10. Moreover, changes in the magnitude of the axial compression force due to riding conditions (e.g., steering, jumping, hitting bumps, and stopping) correspondingly change the radial compressive force 14 applied to steerer tube 11. As riding a bicycle may produce repeated and large magnitude axial compressive forces, steerer tube 11 may be subjected to corresponding repeated and large magnitude radial compressive forces.

As such, a need remains for a steering bearing design that is capable of both securely gripping the steerer tube against high loads without applying excessive and possibly damaging compression forces to the steerer tube.

SUMMARY

The present invention is defined by the following claims, and nothing in this section should be considered to be a limitation on those claims.

In one aspect, one embodiment of a steering bearing assembly includes a cap having a first surface adapted to receive an axial clamping force and a second surface adapted to transmit the axial clamping force. A bearing element includes a first surface in force transmission communication with the second surface of the cap and adapted to receive the axial clamping force and a second surface adapted to transmit the axial clamping force. The cap and bearing element define an axial force transmission path through the respective first and second surfaces thereof. A compression ring is moveably coupled to the cap and is disposed radially inwardly of the bearing assembly outside of the axial force transmission path. The compression ring includes an inner annular surface adapted to transmit a radial compressive force from the cap to a steerer element.

In another aspect, a steering assembly includes a steerer element having an outer circumferential surface and a clamping device coupled to the steering element and applying a tension force thereto. The clamping device compressively engages the bearing assembly, which compressively engages an end portion of a head tube.

In yet another aspect, a method of installing a steering bearing assembly includes disposing a steering bearing assembly over a steerer element, engaging a head tube and applying a clamping force to a cap of the steering bearing assembly with a clamping device. The method further includes transmitting the clamping force from the cap to an annular bearing assembly, and from the annular bearing assembly to the head tube along an axial force transmission path. The method also includes applying a compressive radial force to the steerer element with a compression ring disposed outside of the axial force transmission path.

The various embodiments of the steering bearing assembly, steering assembly, and methods of assembling such assemblies, provide significant advantages over other steerer bearing assemblies. For example and without limitation, the compression ring is isolated from the axial force transmission path, which allows for sufficient gripping of the steerer element while avoiding excessive radial compression forces from being applied to the steerer element. This may be particularly advantageous when the steerer tube is made of materials susceptible to wear or damage in response to compressive forces, such as carbon fiber composites.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "longitudinal," as used herein means of or relating to length or the lengthwise direction, for example of a steerer tube, or assembly thereof. The term "radial," as used herein, means directed toward the (longitudinal) axis or surface of a component. The term "coupled" means connected to or engaged with, whether directly or indirectly, for example with an intervening member, and does not require the engagement to be fixed or permanent, although it may be fixed or permanent. The term "transverse" means extending across an axis, and/or substantially perpendicular to an axis. It should be understood that the use of numerical terms "first," "second," "third," etc., as used herein does not refer to any particular sequence or order of components; for example "first" and "second" connector segments may refer to any sequence of such segments, and is not limited to the first and second connector segments of a particular configuration unless otherwise specified.

Figure 1:
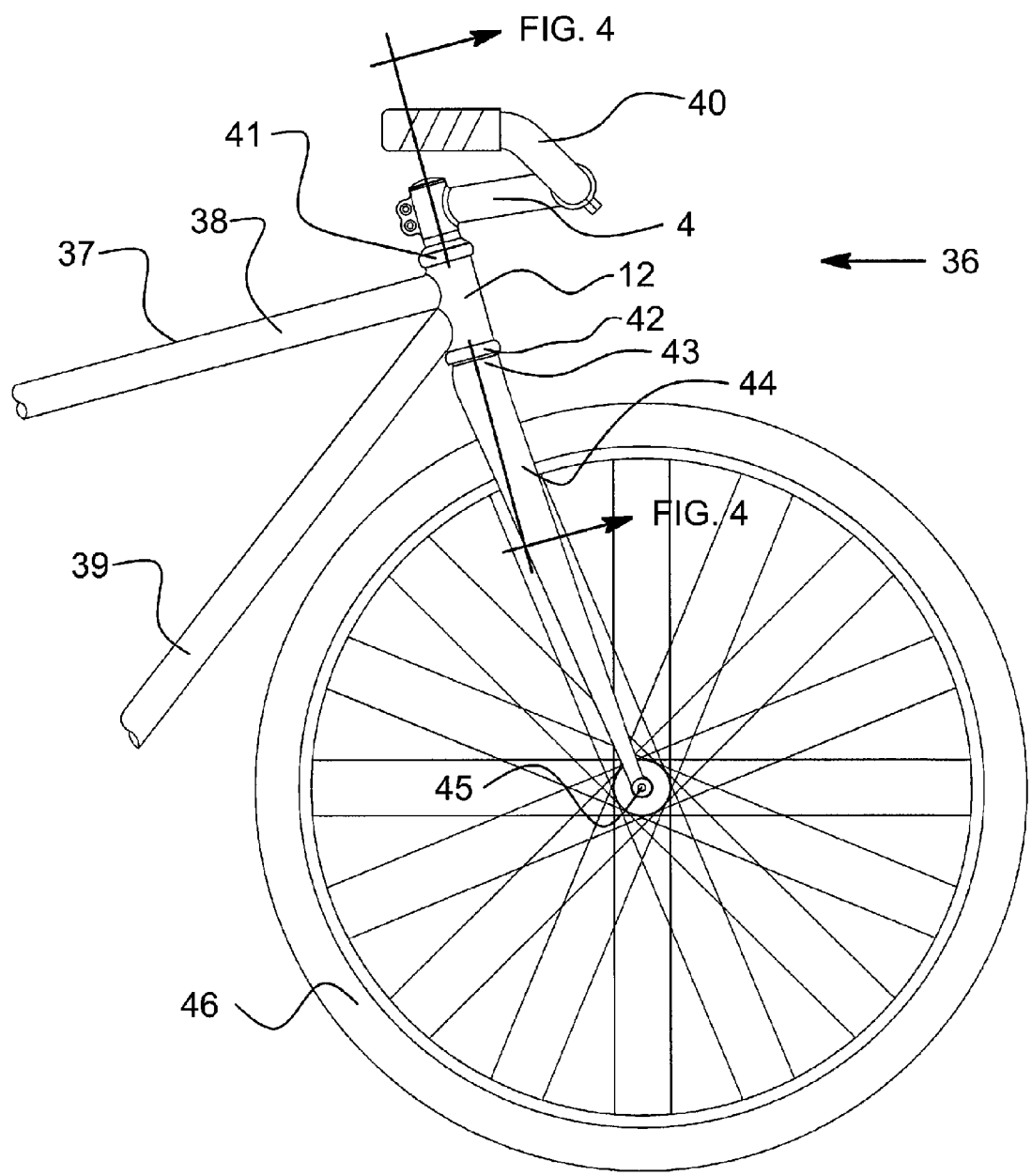
FIG. 1 is a partial side view of a bicycle showing a front assembly thereof.
Figure 2:
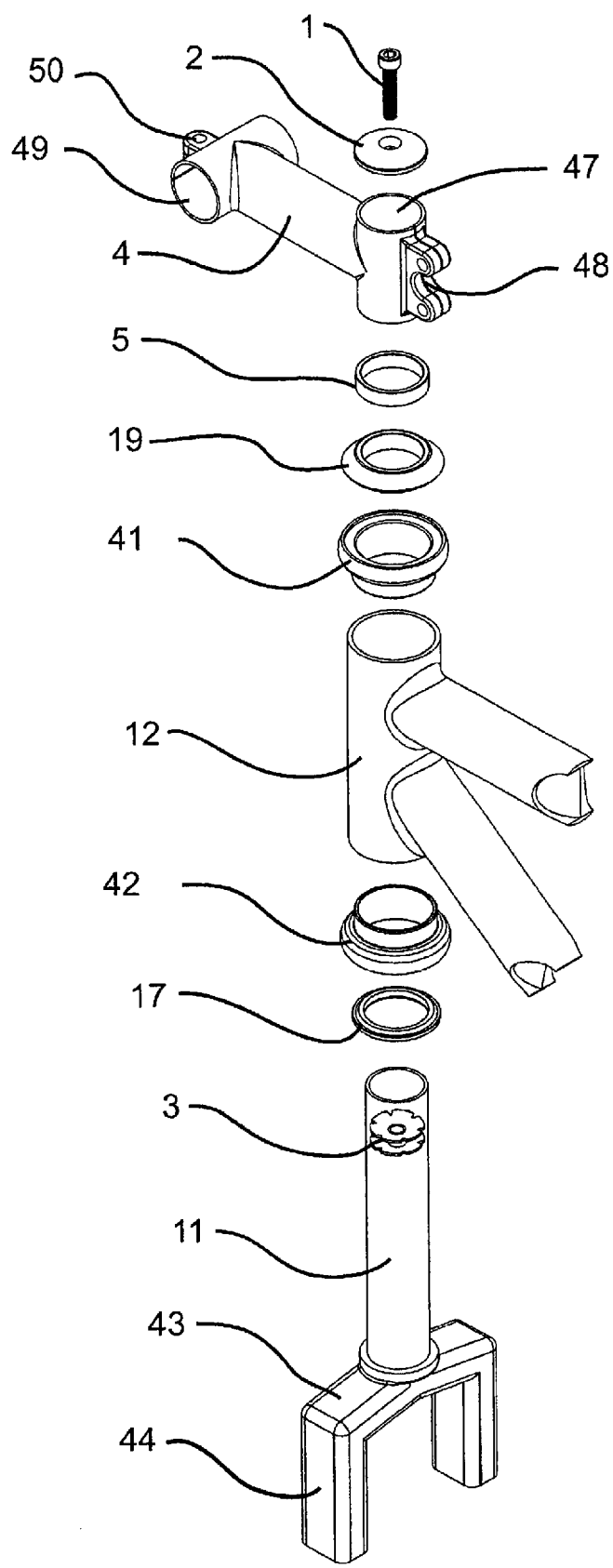
FIG. 2 is an exploded view of a steering assembly.
Figure 3:
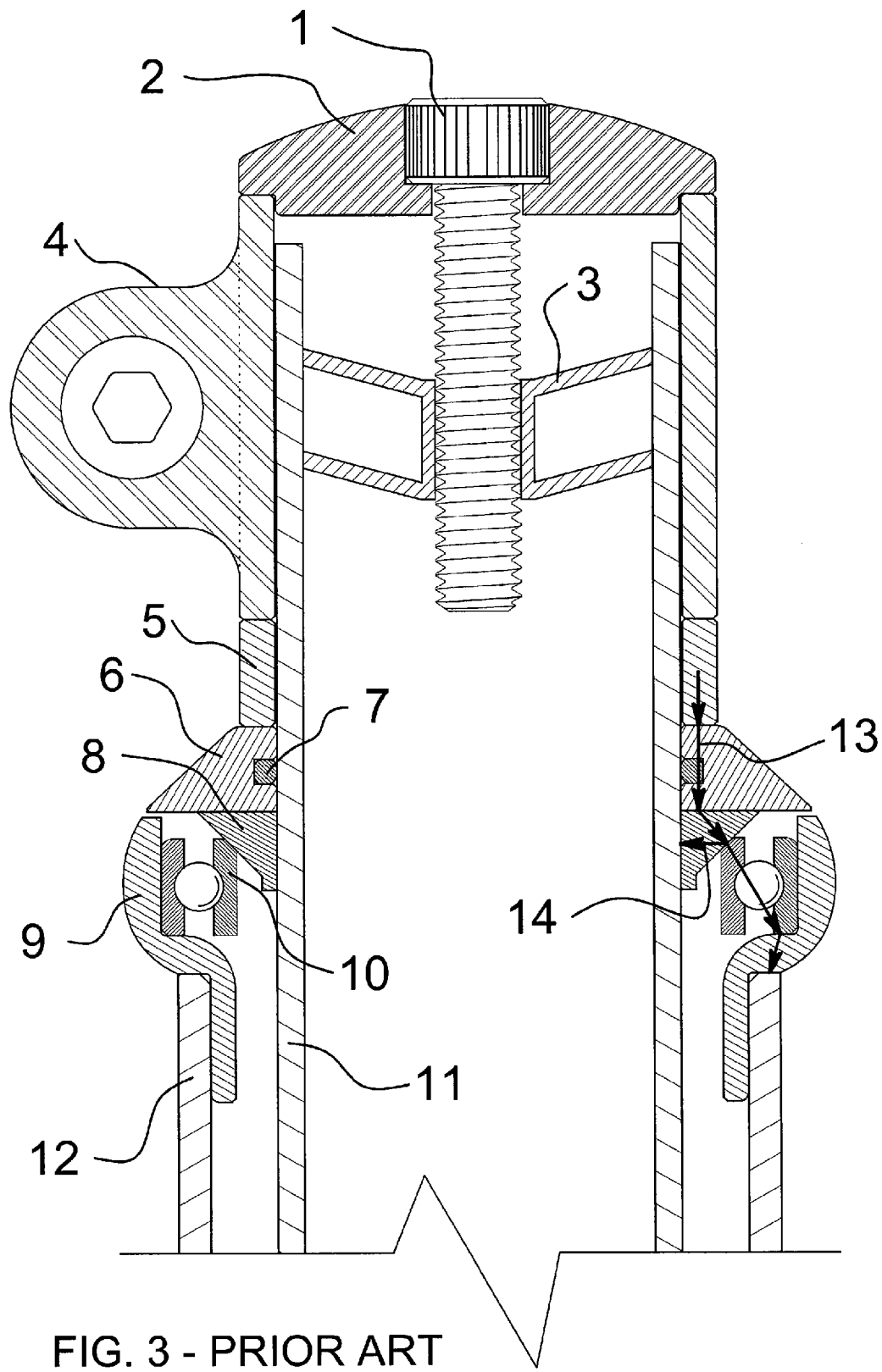
FIG. 3 is a partial cross-sectional view of a prior art steering bearing assembly.

An axial force transmission path through a steering assembly on a bicycle describes how forces are transmitted from one end of the steering assembly to the other. Referring to FIGS. 1 and 2, one embodiment of a steering assembly includes a steerer tube 11 with fixed stops at both ends and a stack of steering components on the tube that are captured between the two fixed ends. It should be understood that the steerer tube 11, otherwise referred to as a steerer element, may be solid, rather than have an opening therethrough. Due to the captured configuration, changes in length can cause tensile and compressive forces to develop. Under riding conditions, external loads that are applied to the front wheel 46 or handlebars 40 are transmitted to the steerer tube 11 via mechanical connections to the steerer. The geometry and mechanical arrangement of components in the steering assembly may result in large axial forces being generated (up to 10 to 20 times those of a normal bearing pre-load force) in response to applied external loads. The steerer tube 11 is the primary member that transmits axial tensile forces. At the lower end there is a fixed stop (crown race) on the steerer tube that engages the lower steering bearing. At the top end of the steerer there is a clamping device, including for example a stem cap 2, attached to the steerer element and which is capable of axial adjustment. The clamping device firmly fixes a stem 4 (which connects to the handlebars 40) to the steerer element 11. In use, the steerer tube 11 is under slight axial tensile force while the stack of steering components is under a corresponding slight axial compressive force. During assembly, the clamping location of the stem 4 is adjusted to remove clearances between elements in the stack of steering components. For most steering bearing assemblies a slight preload (compression force) is desirable.

When using bearing assemblies 41, 42 that contain ball or roller elements between two bearing races it is common practice to apply a slight compressive preload. On bicycles, the orientation of the bearings is such that as the fixed ends on the steerer are drawn together (steerer under tension) a compressive force is applied to the ball or roller elements. Bearings under a slight preload are better able to resist applied forces and have greater durability. The slight preloads act to retain the ball or roller elements in their correct location so that an applied load is shared over many or all of the elements.

Axial containment of the steering assembly is performed by the fixed ends on the steerer tube 11. The lower fixed end is where the steerer tube joins the fork crown 43 and is thus part of the fork structure. The upper fixed end is configured as the clamping device placed on the steerer tube 11, which is typically part of the stem 4 that secures the handlebars to the steerer tube.

Between the two fixed ends on the steerer tube are an assembly of steering components, including the head tube 12 of the frame and all the steering bearing components as well as optional spacers. Spacers 5 and spacer-like components to mount accessories are placed between the stem 4 and the steering bearing top cap 19 to adjust the stem height and the associated handle bar height. In some embodiments, the spacers 5 are optional and may be omitted. The axial force transmission path follows the rigid connections of the steering components. From fork to handlebars, the path typically goes from the fork crown race 17 to the lower bearing assembly 42 and is transmitted through the head tube 12 to the upper bearing assembly 41. The upper bearing assembly 41 then transmits the force to steering bearing top cap 19 and then to spacers 5 and stem 4.

The steering bearing 41 may include two races, which can be described as an inner race and an outer race, an upper ring and a lower ring or a fixed race and a rotating race. One race is rotationally fixed to the steerer tube 11 and the other race is rotationally fixed to the head tube. The interface of the two races is such that they can turn freely against each other. Common means of creating a low resistance interface is to locate rolling elements (e.g., balls or rollers) between the surfaces of the two races or use low-friction surfaces that slide freely relative to each other. Examples of bearings with rolling elements are cartridge ball bearings and tapered roller bearings. Examples of bearings with sliding surfaces are bronze bushings, plastic sleeves/bushings or PTFE coated surfaces.

The rotating bearing race is the race that is fixed to the steerer tube so that it moves with rotation of the steerer. From the rider's point of view this race moves when the bicycle is steered. The fixed bearing race is the race that is attached to the head tube of the bicycle frame and does not move with rotation of the steerer. From the rider's point of view this race is fixed bicycle frame and does not move as the bicycle is steered. The steering bearing top cap 19 is located in the upper bearing location and provides the mechanical connection between the steerer and the rotating bearing race. The steering bearing top cap 19 provides the axial stop for the steering components located above it (e.g., spacers, cable hangers, stem, etc.).

The head tube 12 is firmly secured to the vehicle frame (chassis). The steerer tube 11, or steerer element, extends upwardly from the fork structure 43, 44 and passes through the head tube 12 and enables the connection of handlebars and stem. The steering bearing assemblies 41, 42 engage with the steerer tube, handlebars, and stem to allow steering of the vehicle.

A compression ring, which may be compliant or rigid, engages the steerer tube and locates the bearing assembly relative thereto. A compliant compression ring, such as a compressed o-ring or similar resilient structure, performs a gripping action but is not rigid and allows some movement under applied forces. A rigid gripping structure, like a wedge, does not allow movement between parts under the influence of applied forces.

Referring again to FIGS. 1 and 2, bicycle 36 includes wheel 46, handlebar 40, and front portion of bicycle frame 37. Head tube 12 is attached to top tube 38 and down tube 39 to make up the front portion of bicycle frame 37. Fork 44 is bolted to wheel 46 by axle bolt 45. The upper ends of each leg of fork 44 are connected by fork crown 43. As shown in FIG. 2, steerer tube 11 extends from fork crown 43. Steerer tube 11 passes through head tube 12 and through the steerer tube connector 47 portion of stem 4. Steerer tube connector 47 is clamped to steerer tube 11 by bolts 48. Handlebar 40 (FIG. 1) passes through the handlebar connector 49 portion of stem 4. Bolt 50 is used to clamp handlebar connector 49 to handlebar 40. Thus, handlebar 40 is connected to wheel 46, so that wheel 46 can be turned by handlebar 40. Steerer tube 11 (FIG. 2) is secured within head tube 12 while still being allowed to rotate when handlebar 40 is turned. To enable rotation, there is a lower bearing assembly 42 and an upper bearing assembly 41 mounted between steerer tube 11 and head tube 12.

Figure 4:
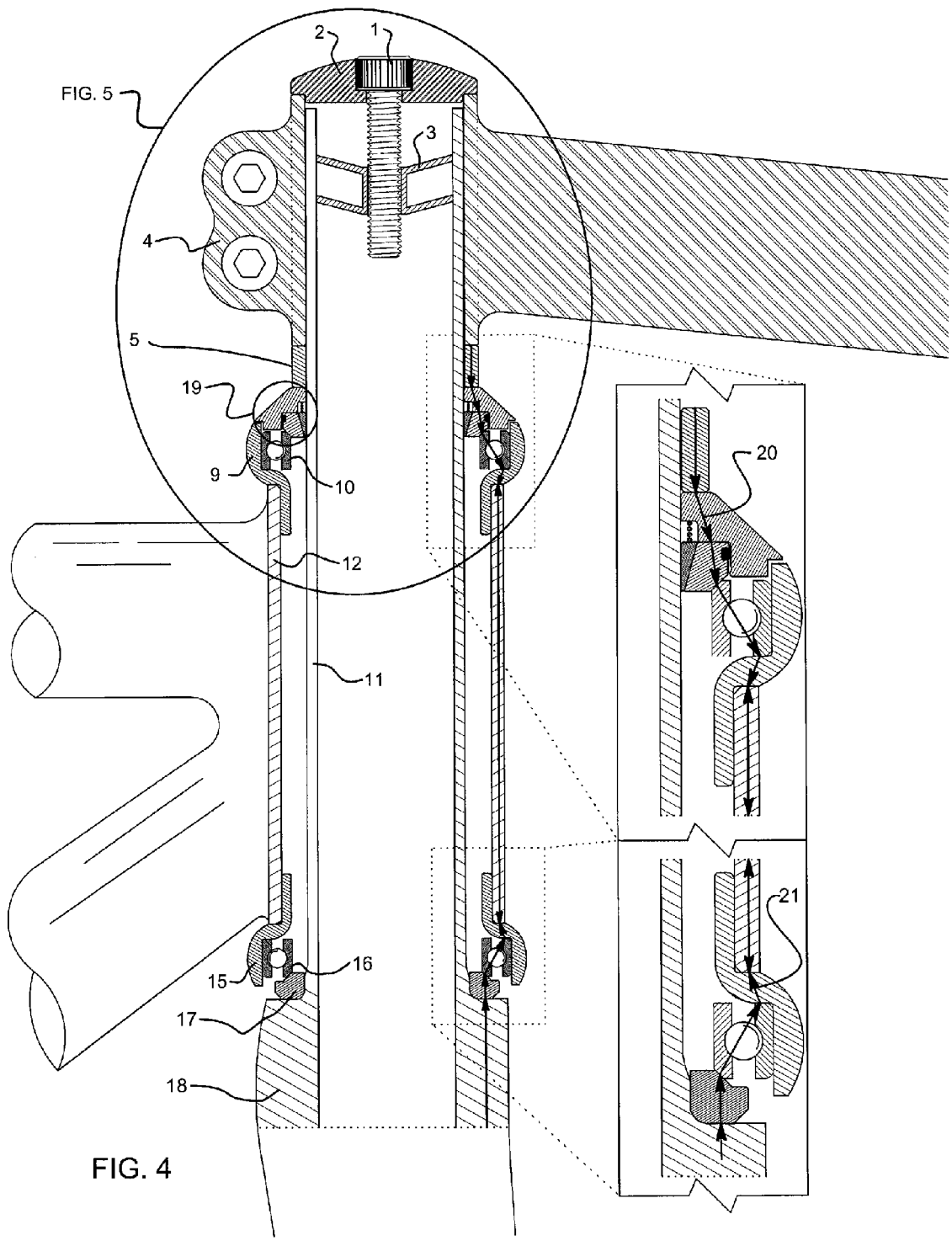
FIG. 4 is a cross-sectional view of one embodiment of a steering bearing assembly taken along line 4-4 of FIG. 1.

FIG. 4 depicts one embodiment of the bearing assembly as it would be installed in a bicycle, tricycle, or similar vehicle. An upper cup 9 and a lower cup 15 are fixably mounted (e.g., press fit) to head tube 12. In other embodiments, the cups may be omitted, with bearing elements directly engaging upper and lower end portions of the head tube. Upper bearing element 10 rests within upper cup 9, or engages the upper end of the head tube, and lower bearing element 16 rests within lower cup 15, or engages the lower end of the head tube. In either embodiment, the cup, or the end or the head tube, are referred to as a base. Steerer tube 11 is inserted through lower cup 15 and lower bearing element 16 and passes through head tube 12, cup 9, and bearing element 10. Steerer tube 11 is stopped when crown race 17, fixedly attached to fork crown 18, contacts lower bearing element 16. Top cap assembly 19 slides onto steerer tube 11 until it contacts upper bearing element 10. Spacer(s) 5, if needed, and stem 4 are slid onto steerer tube 11 and rest upon top cap Assembly 19. Fixed nut 3 is fixed into steerer tube 11, for example by welding or with a self-wedging fit due to the angled configuration of the nut 3, or combinations thereof. Stem cap 2 is placed on top of stem 4 with stem cap bolt 1 passing through the stem and threadably engaging nut 3. The bolt 1 is tightened to draw all of the aforementioned components together. A clamping portion of stem 4 fixes the entire stack of components in place once proper adjustment has been achieved.

The clamping of stem 4 to steerer tube 11 captures all components of the steering bearing assembly (excluding stem cap bolt 1, stem cap 2, and fixed nut 3) on steerer tube 11 between the fixed ends comprised of fork crown 18 and stem 4. Steerer tube 11 is an integral part of fork crown 18. As shown in FIG. 4, upper axial force transmission path 20 and lower axial force transmission path 21 travel from the fork to fork crown 18 to crown race 17 to lower bearing element 16 to lower cup 15, through head tube 12 to the upper steering bearing assembly [9, 10, and 19], spacer(s) 5 and stem 4.

Figure 5:
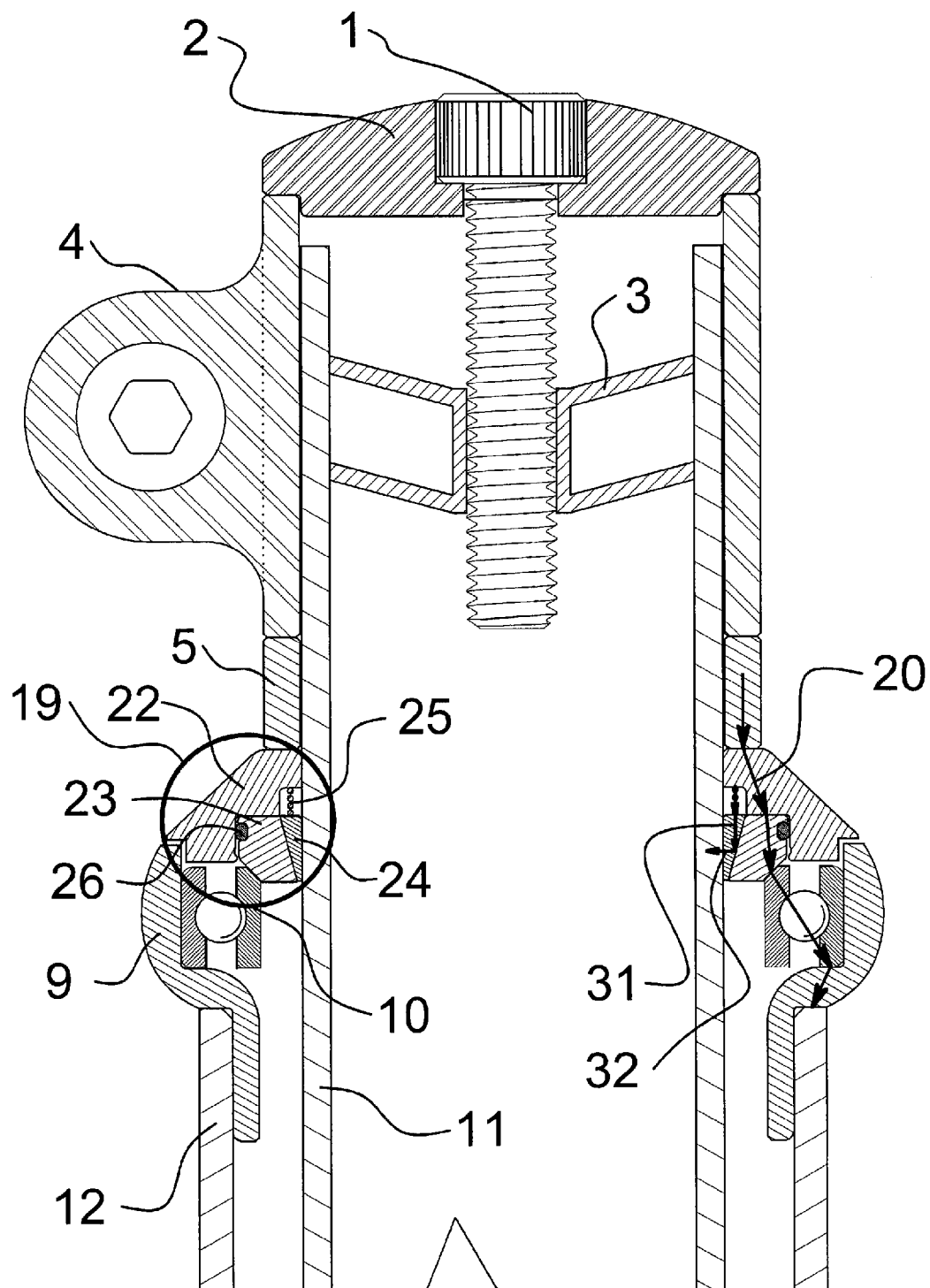
FIG. 5 is an enlarged cross-sectional view of the steering bearing assembly take along line 5 of FIG. 4.

Referring to FIG. 5, top cap assembly 19 may be held together as one unit. The top cap assembly 19 includes top cap 22, resilient element 25, compression ring 24, force applying tapered ring 23, and retention element 26. Compression ring 24 nests within tapered ring 23. Retention element 26 holds force applying tapered ring 23 and compression ring 24 into a detent feature 33 of top cap 22 as shown in FIG. 6. Resilient element 25 is located between compression ring 24 and top cap 22. The resilient element 25 may be configured as a compression spring, elastomeric element, or other biasing component. When the entire stack of components [4, 5, 22, 23, 10, 9, and 12] is drawn together by stem cap bolt 1 and stem cap 2, top cap assembly 19 contacts bearing element 10. Resilient element 25 then imparts a prescribed urging force 31 on compression ring 24 that works in conjunction with the tapered surface of force applying tapered ring 23 to actuate the radial compressive force 32 against steerer tube 11, rotationally connecting bearing element 10 to steerer tube 11 and radially fixing it within bearing element 10. At the same time, all components are fixed axially on steerer tube 11.

At completion of installation, an axial force transmission path 20 is connected through the stacked components: 4, 5, 22, 23, 10, 9, and 12. Compression ring 24 and resilient element 25 are intentionally excluded from axial force transmission path 20. Therefore, forces 31 and 32 and the resulting gripping of compression ring 24 to steerer tube 11 are unaffected by changes in axial forces along axial force transmission path 20. Any added axial forces due to riding do not increase radial force 32. The magnitude of radial force 32 is dictated by the choice of resilient element 25 and geometry of compression ring 24. By design, radial force 32 is decoupled from the influence of added axial forces after installation is complete.

Figures 6A, 6B:
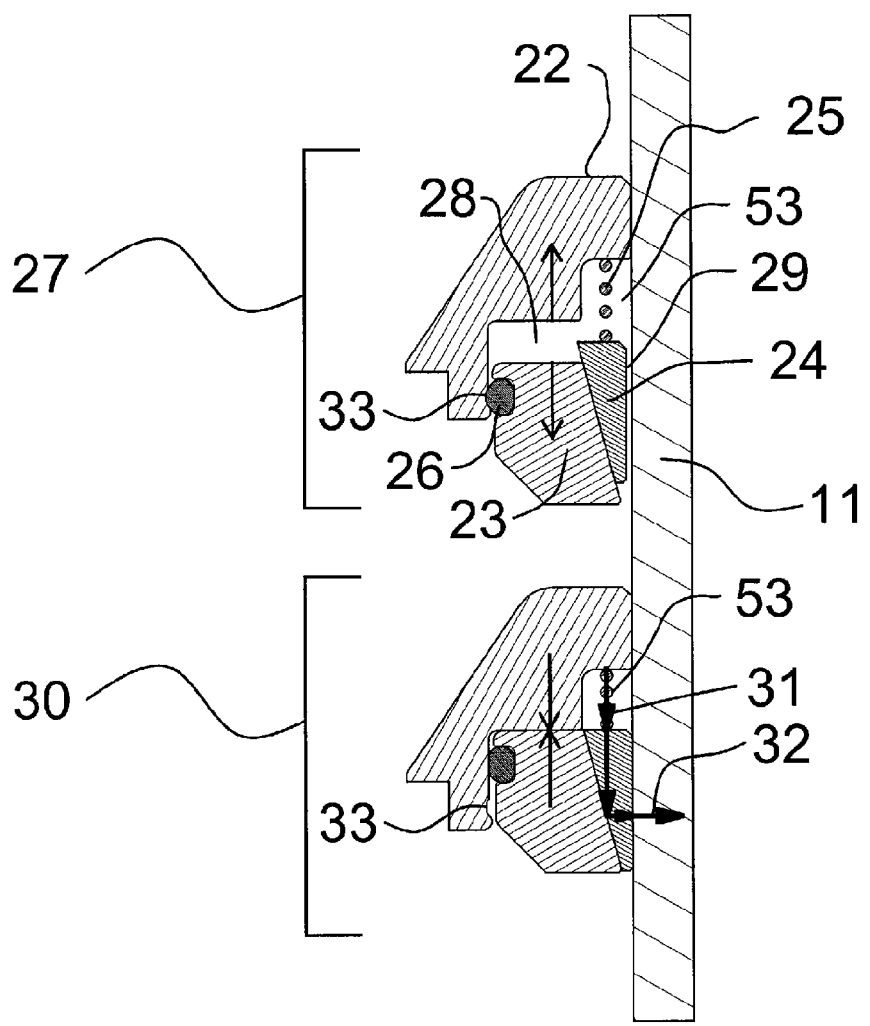
FIGS. 6A and B are cross-sectional views of showing a compression ring in energized and de-energized positions.

As shown in FIG. 6B, during installation, but before top cap assembly 19 contacts bearing element 10, top cap assembly 19 is in its de-energized state 27. In its de-energized state, tapered ring 23 is held away from top cap 22 to create an installation clearance 28 for compression ring 24 and to reduce or eliminate the force imparted by resilient element 25. Installation clearance 28 permits compression ring 24 to move axially along the mating tapered surfaces of compression ring 24 and tapered ring 23, allowing compression ring 24 to expand and create steerer tube clearance 29 around steerer tube 11 to facilitate installation. When top cap assembly 19 contacts bearing element 10 and the entire stack of components [4, 5, 22, 23, 10, 9, and 12] is then drawn together by stem cap bolt 1 and stem cap 2 as shown in FIGS. 5 and 6B, the top cap assembly 19 transitions into its energized state 30. When energized, top cap 22 contacts tapered ring 23 removing (i.e., closing) installation clearance 28. This creates a defined space for resilient element 25. Resilient element 25 then imparts the prescribed urging force 31 on compression ring 24 as described above.

Figure 7:
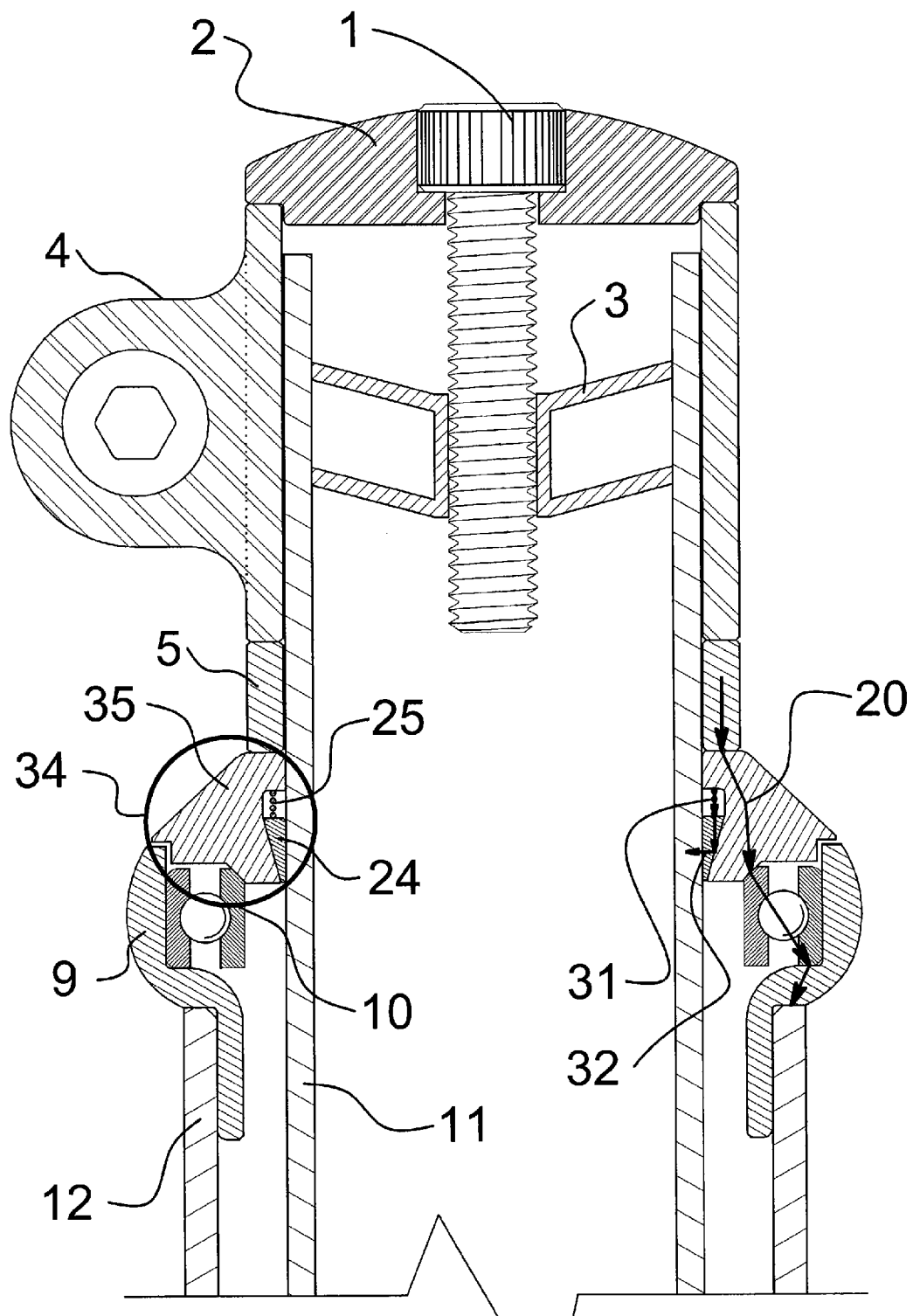
FIG. 7 is a cross-sectional view of another embodiment of a steering bearing assembly.

In an alternative embodiment, shown in FIG. 7, top cap 22 and tapered ring 23 are integrally formed as one piece, referred to as a unified top cap 35. Top cap assembly 34 is comprised of unified top cap 35, compression ring 24 and resilient element 25. Compression ring 24 is nested within unified top cap 35. Resilient element 25 is located between unified top cap 35 and compression ring 24. Stem cap bolt 1 and stem cap 2 act to draw the entire stack of components together, connecting axial force transmission path 20 through the stacked components: 4, 5, 35, 10, 9, and 12. Compression ring 24 and resilient element 25 are intentionally excluded from axial force transmission path 20. Unified top cap 35 includes a defined space for resilient element 25 such that resilient element 25 imparts a prescribed urging force 31 on compression ring 24. The tapered inner surface of unified top cap 35 translates prescribed urging force 31 into radial compressive force 32. Thus, The urging force 31 and the radial compression force 32 and the resulting gripping of compression ring 24 to steerer tube 11 are unaffected by axial forces moving through axial force transmission path 20.

The act of assembling the steering bearing assembly has three simultaneous results: 1) the stacked components are drawn together to locate and then fix them axially on the steerer tube; 2) the rotating race of the upper bearing 10 is securely fixed to the steerer tube 11 by the compression ring 24 that imparts a prescribed radial force on the steerer tube; and 3) an axial force transmission path is created that does not include the steerer gripping mechanism, isolating the gripping force of the compression ring 24 from the influence of any additional axial forces. The proposed design decouples the axial compressive force from the radial compressive force by changing the force transmission path through the steering bearing top cap.

Specifically, in the proposed design, the compression ring 24 is not included in the axial force transmission path 20. In other words, the axial compressive forces go around—but not through—the compression ring 24. Instead, the rigid structure of the steering bearing top cap acts as the transmission path for axial compressive forces so that the internal cavity 53 is unaffected by the axial compressive forces. Within the cavity 53, the resilient element 25, such as a spring or elastomeric o-ring, pushes on the tapered compression ring 24, which applies the desired prescribed radial compression force on the steerer tube. The single act of drawing the stack of components together fixes them axially, securely fixes the rotating race to the steerer tube, and creates an axial force transmission path that does not include the compression ring 24.

Moreover, in one embodiment as shown in FIGS. 6A and B, the radial compression gripping structure may be configured in two states: a de-energized assembly configuration and an energized installed configuration. To facilitate assembly of the steering bearing top cap onto the steerer, it is desirable for the radial compression gripping structure to have clearance during assembly so that it may easily slide over the steerer.

Installation of the components is facilitated when the steerer gripping elements are held in a released state, where the clearance 29 is created between the compression ring and the steerer tube and radial compressive forces are not created until fully assembled. The parts can be arranged to create a "de-energized" state to ease assembly by creating a clearance with the steerer tube. When the parts are drawn together during assembly, the arrangement of parts changes to put the steerer gripping mechanism in an "energized" state. When the parts are fully installed and the gripping mechanism is energized, the axial compressive force path is also created around the gripping mechanism. During assembly, the cap 22 and the force applying ring 23 are allowed to separate and form a gap 28, which allows the compression ring 24 to expand. This creates a clearance 29 between the compression ring and the steerer tube that allows the assembly to be easily installed. As the parts are drawn together to contain the steerer tube within the head tube of the frame, the gap 28 between the cap 22 and ring 23 is closed. With these mating surfaces in contact, the force transmission path 20 around the steerer gripping mechanism is established and the steerer gripping mechanism is put into its steerer gripping state. The process is reversible for disassembly.

The steering bearing top cap with an isolated steerer gripping mechanism securely connects the rotating bearing race to the steerer tube 11 with one or more rigid components, configured as the compression ring 24. A rigid connection differs from an elastic connection in that a rigid connection can achieve a zero clearance connection to the steerer that will resist steerer displacement relative to the rotating race while applying little or no compression force to the steerer. In contrast, for an elastomeric connection to securely connect the rotating race to the steerer the material must be under compression and compression force must be applied to the steerer. A rigid connection permits secure connections between the rotating race of the bearing assembly 10 and the steerer tube 11 with little or no compressive force on the steerer tube.

In addition, the top cap 22 height above the bearing 10 and/or cup 9 remains constant regardless of steerer diameter. Specifically, the axial position of the top cap 22 is not varied as a result of differences in the diameter of the steerer tube. This is accomplished by providing a rigid axial connection that does not include the gripping structure. Any movement of the gripping structure within its defined space does not affect the positioning of the external mating surfaces of the top cap. Specifically, the top cap does not move relative to the rotating bearing race or the cup/bearing fixed in the head tube of the frame. Installation is more consistent and no shims or adjustments are needed to provide proper clearance between rotating parts.

The present configuration also provides for different methods of installing the components. One common method of assembling a gripping type headset onto the bicycle is to individually place the bearing assembly top cap components onto the steerer tube. This forms a loose stack of parts. The reverse is done to remove the parts. One disadvantage of this method is that it is more time consuming and there is opportunity to incorrectly install the parts. A second method of assembly is to use connecting features so that the individual components that make up a bearing top cap assembly may be installed as an integral assembly. The advantage of this method is that assembly is fast and it has a high likelihood of being installed correctly.

The present embodiments allow the bearing top cap assembly to be installed and removed in either manner—as a single assembly or as separate parts. The bearing top cap assembly is delivered in the assembled state and can be easily assembled as a single unit. The individual parts may also be installed individually on the steerer tube and then drawn together and preloaded using the adjusting screw. Finally, it can be removed in either manner: by way of individual parts or as an assembly. The advantage of this approach is that the typical installation can be fast and easy with the bearing top cap assembly going on and off as an assembly. If there is an issue, such as gross contamination with debris, the parts can be taken off individually.

A detent feature 26 and retention element 33 may hold the top cap assembly as an assembled unit in a "released" or de-energized position (FIG. 6B) for easy installation and removal. In this released or de-energized configuration, the gripping mechanism components of the steering bearing top cap are held in a de-energized state, which removes the closing force on the compression ring 24, allowing the compression ring to open and thereby provide clearance around the steerer tube. The compression ring is specifically designed so that when the axial force is released it expands to provide clearance around the steerer.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A steering bearing assembly comprising:
   a cap comprising a first surface adapted to receive an axial clamping force and a second surface adapted to transmit the axial clamping force;
   a bearing element comprising a first surface in force transmission communication with said second surface of said cap and adapted to receive the axial clamping force and a second surface adapted to transmit the axial clamping force;
   wherein said cap and said bearing element define an axial force transmission path through said respective first and second surfaces thereof; and
   a compression ring moveably coupled to said cap and disposed radially inwardly of said bearing assembly outside of said axial force transmission path, wherein said compression ring comprises an inner annular surface adapted to transmit a radial compressive force from said cap to a steerer element.

2. The steering bearing assembly of claim 1 further comprising a resilient element disposed between said cap and said compression ring, wherein said compression ring is moveable relative to said cap in both axial and radial directions.

3. The steering bearing assembly of claim 2 wherein said cap and said compression ring comprise mating tapered surfaces.

4. The steering bearing assembly of claim 1 wherein said compression ring comprises a rigid, non-elastic material.

5. The steering bearing assembly of claim 1 further comprising a base comprising a first surface in force transmission communication with said second surface of said bearing element and adapted to receive the axial clamping force and a second surface adapted to transmit the axial clamping force.

6. The steering bearing assembly of claim 1 wherein said compression ring is moveable relative to said cap in said axial direction.

7. A steering bearing assembly comprising:
   a cap comprising a first surface adapted to receive an axial clamping force and a second surface adapted to transmit the axial clamping force, wherein said cap comprises a housing and a force applying ring coupled to said housing, wherein said housing defines said first surface of said cap and said force applying ring defines said second surface of said cap;
   a bearing element comprising a first surface in force transmission communication with said second surface of said cap and adapted to receive the axial clamping force and a second surface adapted to transmit the axial clamping force;
   wherein said cap and said bearing element define an axial force transmission path through said respective first and second surfaces thereof; and
   a compression ring moveably coupled to said cap and disposed radially inwardly of said bearing assembly outside of said axial force transmission path, wherein said compression ring comprises an inner annular surface adapted to transmit a radial compressive force from said cap to a steerer element.

8. The steering bearing assembly of claim 7 wherein said second surface of said cap is in direct contact with said first surface of said bearing element.

9. The steering bearing assembly of claim 8 wherein said compression ring and said force applying ring comprise mating tapered surfaces.

10. The steering bearing assembly of claim 7 wherein said housing has a lower surface and said force applying ring has an upper surface, wherein said force applying ring is moveable relative to said housing between at least a de-energized position, wherein said upper and lower surfaces are spaced apart, and an energized position, wherein said upper and lower surfaces are engaged.

11. The steering bearing assembly of claim 10 further comprising a detent releasably securing said force applying ring to said housing in said de-energized position.

12. The steering bearing assembly of claim 10 wherein said compression ring is moveably engaged by said force applying ring, and wherein said compression ring is moveable between at least first and second radial positions corresponding to said de-energized and energized positions of said force-applying ring.

13. A steering assembly comprising:
   a steerer element having an outer circumferential surface;
   a clamping device coupled to said steering element and applying a tension force thereto;
   a cap surrounding said steerer element and comprising first and second surfaces, wherein said first surface is compressively engaged by said clamping device;
   an annular bearing element surrounding said steerer element and comprising first and second surfaces, wherein said first surface is compressively engaged by said second surface of said cap;
   a base surrounding said steerer element and comprising a first surface compressively engaged by said second surface of said annular bearing element, wherein said cap, said annular bearing element and said base define an axial force transmission path through said respective first and second surfaces thereof; and
   an annular compression ring radially and compressively engaging said outer circumferential surface of said steerer tube, wherein said annular compression ring is disposed outside of said axial force transmission path.

14. The steering assembly of claim 13 wherein said base is integrally formed as an end portion of a head tube.

15. The steering assembly of claim 13 wherein said base comprises a cup having a second surface compressively engaging an end portion of a head tube.

16. The steering assembly of claim 13 wherein said clamping device comprises a bolt threadably engaged with said steerer element, a stem assembly surrounding said steerer element, wherein said stem assembly comprises first and second ends, said first end compressively engaging said first surface of said cap, and a stem cap engaging said second end of said stem assembly and engaged by said bolt.

17. The steering assembly of claim 16 wherein said stem assembly comprises at least one spacer defining said first end thereof.

18. The steering assembly of claim 13 further comprising a resilient element disposed between said cap and said compression ring, wherein said compression ring is moveable relative to said cap in both axial and radial directions.

19. The steering assembly of claim 13 wherein said cap and said compression ring comprise mating tapered surfaces.

20. The steering assembly of claim 13 wherein said compression ring comprises a rigid, non-elastic material.

21. The steering assembly of claim 13 wherein a distance between said second surface of said cap and said first surface of said base remains constant regardless of a diameter of said steerer tube.

22. The steering assembly of claim 13 wherein said compression ring is moveable relative to said cap in said axial direction.

23. A steering assembly comprising:
   a steerer element having an outer circumferential surface;
   a clamping device coupled to said steering element and applying a tension force thereto;
   a cap surrounding said steerer element and comprising first and second surfaces, wherein said first surface is compressively engaged by said clamping device, wherein said cap comprises a housing and a force applying ring coupled to said housing, wherein said housing defines said first surface of said cap and said force applying ring defines said second surface of said cap;
   an annular bearing element surrounding said steerer element and comprising first and second surfaces, wherein said first surface is compressively engaged by said second surface of said cap;
   a base surrounding said steerer element and comprising a first surface compressively engaged by said second surface of said annular bearing element, wherein said cap, said annular bearing element and said base define an axial force transmission path through said respective first and second surfaces thereof; and
   an annular compression ring radially and compressively engaging said outer circumferential surface of said steerer tube, wherein said annular compression ring is disposed outside of said axial force transmission path.

24. The steering assembly of claim 23 wherein said compression ring and said force applying ring comprise mating tapered surfaces.

25. The steering assembly of claim 23 wherein said housing has a lower surface and said force applying ring has an upper surface, wherein said force applying ring is moveable relative to said housing between at least a de-energized position, wherein said upper and lower surfaces are spaced apart, and an energized position, wherein said upper and lower surfaces are engaged.

26. The steering assembly of claim 25 further comprising a detent releasably securing said force applying ring to said housing in said de-energized position.

27. The steering assembly of claim 25 wherein said compression ring is moveably engaged by said force applying ring, and wherein said compression ring is moveable between at least first and second radial positions corresponding to said de-energized and energized positions of said force applying ring, wherein said compression ring is spaced from said steerer element when said compression ring is in said first radial position, and wherein said compression ring is engaged with said steerer element when said compression ring is in said second radial position.

28. A method of installing a steering bearing assembly comprising:
   disposing a steering bearing assembly over a steerer element, wherein said steering bearing assembly comprises a cap, an annular bearing assembly engaging said cap and a compression ring;
   engaging a head tube with said steering bearing assembly;
   applying a clamping force to said cap of said steering bearing assembly with a clamping device;
   transmitting said clamping force from said cap to said annular bearing assembly, from said annular bearing assembly to said head tube along an axial force transmission path, wherein said compression ring is disposed outside of said axial force transmission path; and
   applying a compressive radial force to said steerer element with said compression ring.

29. The method of claim 28 wherein said disposing said steering bearing assembly over said steerer element comprises disposing a second steering bearing assembly over said steerer element after removing a first steering bearing assembly from said steerer element, wherein either or both of said disposing or removing said second and first steering bearing assemblies respectively comprises disposing or removing said housing, said force applying ring and said compression ring of either of said first or second steering bearing assemblies together as a single assembly or separately as individual components.

30. The method of claim 28 wherein said cap and said compression ring comprise mating tapered surfaces, and wherein said applying said compressive radial force to said steerer element with said compression ring comprises moving said tapered surfaces relative to each other and thereby moving said compression ring radially inwardly toward said steerer element.

31. The method of claim 28 wherein said steering bearing assembly further comprises a cup disposed between said annular bearing assembly and said head tube, and wherein said transmitting said clamping force comprises transmitting said clamping force from said annular bearing assembly to said cup and then to said head tube.

32. The method of claim 28 wherein said applying said compressive radial force to said steerer element with said compression ring comprises moving said compression ring relative to said cap and applying an axial force to said compression ring with a resilient element disposed between said cap and said compression ring.

33. A method of installing a steering bearing assembly comprising:
disposing a steering bearing assembly over a steerer element, wherein said steering bearing assembly comprises a cap, an annular bearing assembly engaging said cap and a compression ring, wherein said cap comprises a housing and a force applying ring coupled to said housing, wherein said force applying ring is disposed between said housing and said annular bearing assembly, and wherein said compression ring and said force applying ring comprise mating tapered surfaces;
engaging a head tube with said steering bearing assembly;
applying a clamping force to said cap of said steering bearing assembly with a clamping device;
transmitting said clamping force from said cap to said annular bearing assembly, from said annular bearing assembly to said head tube along an axial force transmission path, wherein said compression ring is disposed outside of said axial force transmission path; and
applying a compressive radial force to said steerer element with said compression ring.

34. The method of claim 33 wherein said transmitting said clamping force from said cap to said annular bearing assembly comprises moving said force applying ring from a de-energized position, wherein said force applying ring is spaced from said housing along said axial force transmission path, to an energized position, wherein said force applying ring is engaged with said housing along said axial force transmission path.

35. The method of claim 34 wherein said moving said force applying ring from said de-energized position to said energized position comprises releasing a detent releasably securing said force applying ring to said housing in said de-energized position.

36. The method of claim 35 wherein said moving said force applying ring from said de-energized position to said energized position comprises engaging said compression ring with said force applying ring and moving said compression ring from a first radial position, wherein said compression ring is radially spaced from said steerer element, to a second radial position, wherein said compression ring is engaged with said steerer element.

\* \* \* \* \*